United States Patent [19]

Vatz

[11] 3,898,446

[45] Aug. 5, 1975

[54] QUADRATIC PHASE MEMORY

[75] Inventor: Bernard W. Vatz, Huntsville, Ala.

[73] Assignee: The United States of America as represented by the Secretary of the Army, Washington, D.C.

[22] Filed: Sept. 6, 1974

[21] Appl. No.: 503,834

[52] U.S. Cl. .................................. 235/156; 235/186

[51] Int. Cl.² .......................................... G06F 15/34

[58] Field of Search ................. 235/156, 186; 444/1

[56] References Cited

UNITED STATES PATENTS

| | | | |
|---|---|---|---|
| 3,569,684 | 3/1971 | Burnett | 235/186 X |
| 3,636,333 | 1/1972 | Klund | 235/156 |
| 3,735,110 | 5/1973 | LeComte | 235/186 X |

*Primary Examiner*—R. Stephen Dildine, Jr.
*Attorney, Agent, or Firm*—Lawrence A. Neureither; Joseph H. Beumer; Robert C. Sims

[57] ABSTRACT

Twiddle factors are generated by a memory unit which is divided into two symmetrical sections; each section contains the magnitude words for one half of a quadrant. After the memories are addressed and read, the twiddle factor is assigned to either the sine or cosine by a pair of switching means, and then the proper sign is attached by a pair of sign generators. A clock circuit is provided to address the memory units and select the states of the switching networks and sign generators.

6 Claims, 4 Drawing Figures

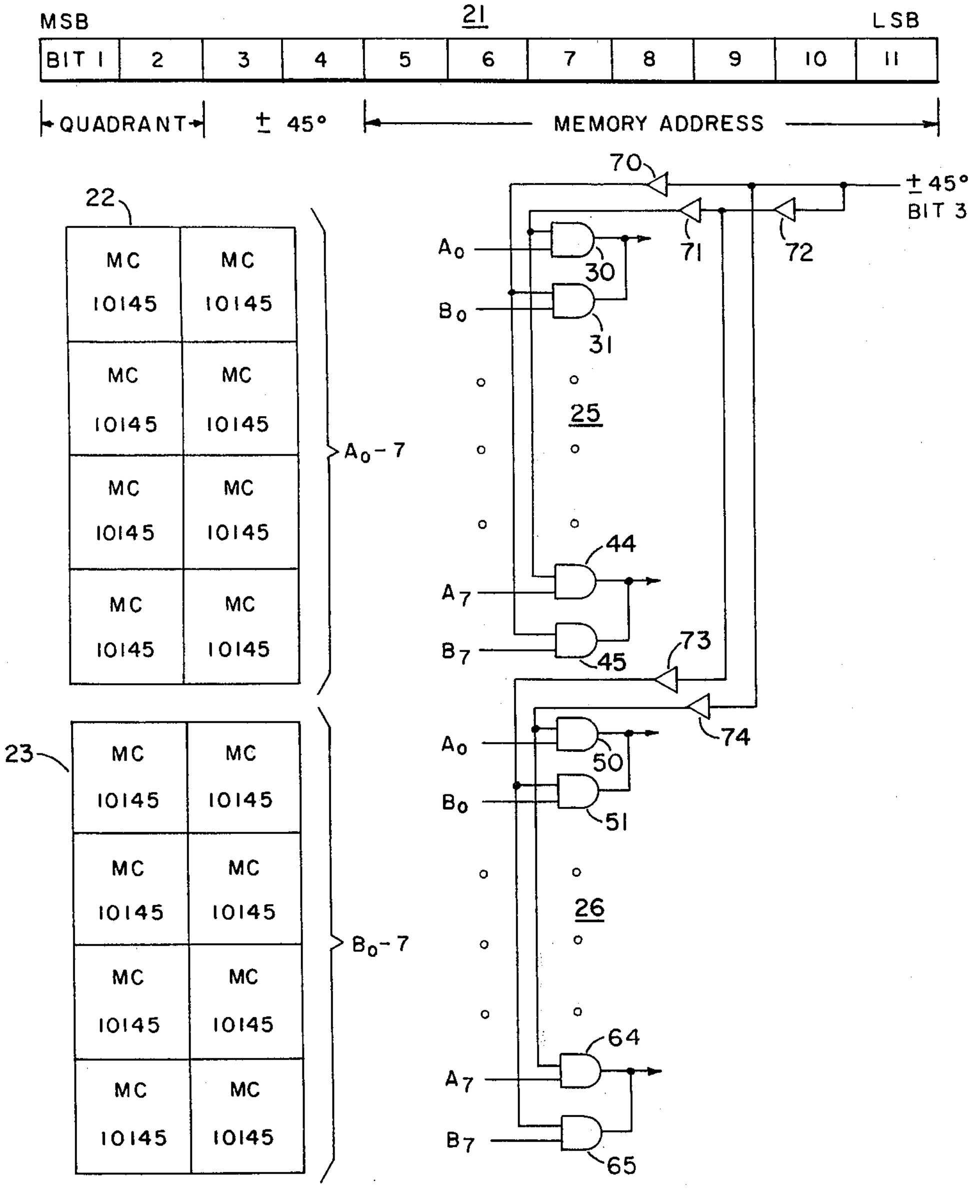
FIG. 2
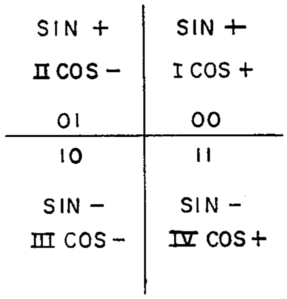
FIG. 3
TRUTH TABLE
| BIT 1 | BIT 2 | COS | SIN | QUADRANT |
|---|---|---|---|---|
| 0 | 0 | 0 | 0 | I |
| 0 | 1 | 1 | 0 | II |
| 1 | 0 | 1 | 1 | III |
| 1 | 1 | 0 | 1 | IV |
FIG. 4

QUADRATIC PHASE MEMORY

SUMMARY OF THE INVENTION

The present invention performs the function of reducing the memory requirements in a conventional multiplier stage of a Fast Fourier Transform Stage (FFT). The invention uses only one K (1048 bits) of memory to generate the eight bits for the sine and cosine. The invention makes use of the facts that a four quadrant sine/cosine circle may be reduced to one quadrant by noting that the magnitude of the sine/cosine repeats in every quadrant and only the signs change. Thus a one equadrant table with external sign control (sign-magnitude, 1's complement, 2's complement codes could all be used) may be used. Again noting that sin $\theta = \cos(90° - \theta)$ simplifies the table by allowing one table for both sine and cosine functions. In the invention two 64 word bit memories are used. Each word has an eight bit cosine value which is a 0.7° increment. Memory A covers from 0° to 45° and memory B covers from 45° to 90° and is symmetrical to A. In other words, the quadrant is broken in two 45° halves. When the cosine is read from one, the sine is read from the other since sin $\theta = \cos(90° - \theta)$. With this symmetry, if the cosine value is in memory A word 2, the sine value would be found in memory B word 62 (i.e. opposite memory, word 64 minus cosine word number). After the magnitudes of the sine/cosine are determined the proper sign is attached to correspond to the quadrant. Since the twiddle values have an orderly progression, a simple binary clock is used to generate the control functions.

BRIEF DESCRIPTION OF THE DRAWINGS

FIG. 2 shows sections of the preferred embodiment of the invention in greater detail;

FIG. 3 shows the signs of the sine and cosine in the four quadrants; and

FIG. 4 shows a truth table for FIG. 3.

DESCRIPTION OF THE PREFERRED EMBODIMENT

Figure 1:
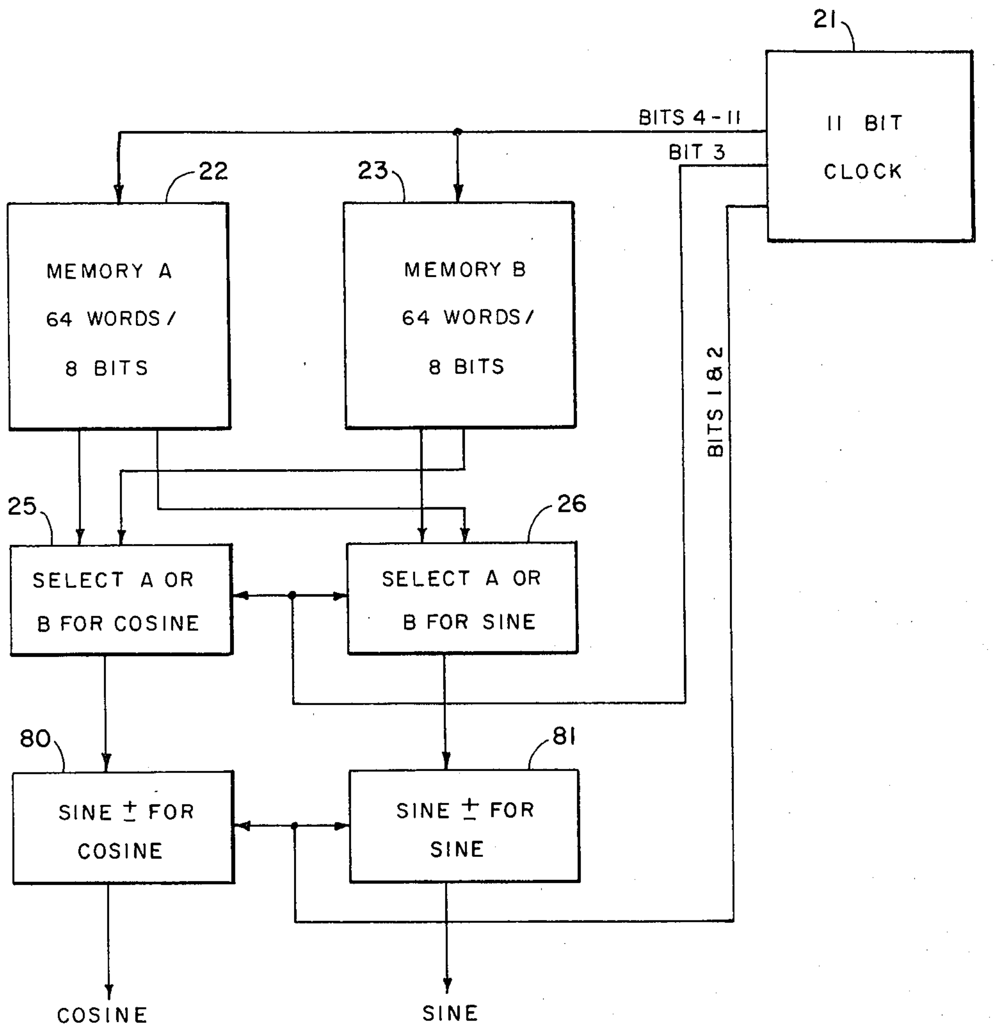
FIG. 1 is a block diagram showing the overall embodiment of the invention.

The function of this device is to reduce the memory requirement in a conventional multiplier stage of a Fast Fourier Transform Stage (FFT). This device uses trigonometric identities and switching in a unique configuration to reduce the amount of hardware required for memory while maintaining a high data throughput rate.

The problem being solved by this device is complex multiplication which may be represented as follows:

$$X = (a + ib)(\cos\theta + i \sin\theta)$$

where $X$ is the complex product $a$ and $b$ are the data input cos $\theta$ and sin $\theta$ are the multiplication factors for the complex multiplication (Twiddle factors) For every value of X, values of cos $\theta$ and sin $\theta$ must be generated either externally or from a memory. This invention generates these values with a minimum amount of storage places or bits.

The solution in common practice is to use one data word of Y bits (Y depends on the accuracy required) for each cos $\theta$ and sin $\theta$ for every different multiplication. This leads to an enormous amount of memory for the storage of these values (i.e. $\approx 2^{n-1}$ data words where n is the number of FFT stages or $\approx Y\,2^{n-1}$ data bits). This conventional approach can be expensive due to the large amount of memory which is required.

Four primary differences exist when the invention is compared to conventional hardware. This invention does not require two memories of which one is for sine memory and the other is for cosine memory; this invention reduces the sine/cosine unit circle from four quadrants to one quadrant; this invention uses sine/cosine bit accuracies to reduce memory requirements; and, this invention uses switching circuitry to reduce memory requirements.

It should be pointed out that the cost/effectiveness of this device relative to the conventional approach depends upon the specific application in question. Major issues are as follows: (1) accuracy requirement, (2) speed requirements, and (3) logic circuits being used.

The invention being claimed is more general than the specific design described in this section. This design was developed for one particular application known to the author. The invention is applicable, with minor modification, to a wide variety of requirements.

The example application selected was for a special purpose data processor to perform Fast Fourier Transforms (FFT). This data processor takes as an input a large number of complex time samples of an electrical signal and calculates the Digital Fourier Transform thus producing the frequency spectrum of the signal. Calculation of the FFT requires an enormous number of vector rotations and, indeed, the greatest portion of FFT cost is related to these vector rotations.

The example application is for a 4,000 point transform being computed by 12 sequential stages arranged in a "pipeline" fashion. The data processor uses the Sande-Tukey algorithm in a radix 2 design (two points transformed at a time). The data words for the sine/cosine are eight bits in length.

The large memory requirements in a conventional FFT memory are caused by the number of Twiddle factors which are needed for each FFT stage. These Twiddle factors are the complex numbers which each data word is multiplied by in the FFT process. The number required by conventional means increases by a factor of two for each FFT stage. In this application, the Twiddle factors can be generated by moving a vector of unity magnitude around a unit circle. The various Twiddle factors correspond to discrete points on the edge of the circle. These are represented by sin $\theta$ and cos $\theta$ values.

The new design exploits the symmetry of the sine and cosine and uses explicit clock control with switching to reduce memory requirements. The magnitude of the sine and cosine repeats in every quadrant, only the sign (+/−) of this magnitude changes. In addition, the sine is related to the cosine by the expression of sin $\theta = \cos(90° - \theta)$. Thus the 360° circle may be reduced to 45° resulting in a memory saving of a factor of eight. However, if clock control, switching, and bit accuracies are used, the saving may be increased to a factor of 48.

It is generally agreed that an eight bit word (sign + 7 bit magnitude) is sufficient for both the sine and cosine values. If the bit for the sign (+/−) is neglected for the time being, this amounts to 128 different values ($2^7 = 128$). So, all of the values for the sine and cosine may be generated with 128 7-bit words. After the magnitude is generated, the correct sign (+/−) may be added to indicate which quadrant is in use. Since only 512 different values (all quadrants considered 128 × 4) are available because of the 7 bit precision, it would seem that some of the values must be used more than once for large Twiddle memories. This, in fact, happens, and for this example each value is used 4 times. The accuracy would seem to suffer a degrading effect; however, it does not because of the way the trigonometric functions change in value and the conversion to only 7 digital bits FIG. 1 shows a block diagram of the new design. An eleven bit clock 21 is used to generate the proper control bits shown in greater detail in FIG. 2. Bits 4–11 address the two memory sections, bit 3 selects the proper memory for sine and cosine, and bits 1 and 2 select the proper sign (+/−) for the magnitude values. The Twiddle factors use a simple progression which corresponds to a slow rotation on the unit circle. Thus a simple binary counter may be used.

The memory is divided into two symmetrical sections 22 and 23. Memory A contains the magnitude words for the degrees 0°–45°, and memory B contains the magnitude words for 45°–90°. The two sets of memories are available for addressing at the same time by clock 21. The identity sign $\theta = \cos(90° - \theta)$ shows that while the cosine is read out of one memory, the sine is read out of the other. For example: if one degree is being read out of memory A, then 89° is being read out of the memory B because of the symmetrical arrangement of the 16 MC10145 64 bit RAM's of the memory sections 22 and 23. The memory words in memories A and B read the magnitude word for the sine of the angle it represents. Of course the words would have been set up to read the cosine of the angle that they represent if this was desirable. So assuming in the example that $\theta$ equals 1°, even though the memory B was reading the sine of 89° this in fact equals the cosine of one degree which is what is desired.

After memories 22 and 23 are addressed and read, the twiddle factor is assigned to either the sine or cosine output by switching circuits 25 and 26. FIG. 2 shows the switching circuits in schematical form. Each switching circuit contains 16 AND gates 30–45 or 50–65. An 11-bit clock 21 addresses memory units 22 and 23 in the well known manner so as to cause them to have outputs from their memories $A_{0-7}$ and $B_{0-7}$ which represent the sine and cosine of the particular angle being addressed in the memories. In order to select which memory word is to be used for the sine and which is to be used for the cosine, invertors 70–74 are connected to the ±45° bit position 3 of the 11-bit clock 21. If bit position 3 is a zero then the angle $\theta$ is less than 45°. Therefore memory $A_{0-7}$ represents the sine of $\theta$ and memory $B_{0-7}$ represents the cosine of $\theta$. Due to the connections of the invertors to AND gates 30–45 and 50–65, memory A is enabled to the output of switching circuit 26 and memory B is enabled to the output of switching circuit 25. When $\theta$ becomes greater than 45° in a particular quadrant, bit position 3 of the clock 21 becomes a positive output which causes memory A to be fed to the output of switching circuit 25 and memory B to be fed to the output of switching circuit 26.

Sign generating circuits 80 and 81 of FIG. 1 apply the proper sign to the selected memory word. FIG. 3 shows the sign of the sine and cosine twiddle factors in accordance to which quadrant they are in. FIG. 4 shows a truth table of the values of bits 1 and 2 of the clock 21 and the cosine and sine signs in accordance to the quadrant the twiddle factors are being determined. In the table of FIG. 4 a 0 for the cosine and sine stands for the sign being positive, and a 1 stands for the sign being negative. From this it is obvious that the bit position 1 of the clock 21 corresponds to the sign of the sine output and the exclusive OR of bit 1 and 2 of the clock 21 corresponds to the sign of the cosine output. Therefore, bit 1 can be fed to the sine generator 81 and bits 1 and 2 can be fed through an exclusive OR gate to the sine generator 80 for control purposes. In a system which has a separate bit position for the sign of a word, the value this bit position is produced by circuits 80 and 81. If a 1's complement code is assumed then sine generators 80 and 81 could take the shape of exclusive or circuits having one side connected up to receive the word from circuits 25 or 26 and the other side connected to circuits from bits 1 and 2 of the clock 21.

In order to provide the proper sequence of operation, the 11-bit clock 21 is divided up into two sections. Bits 4–11 are cycled in an up/down counter method. The counter will count up to a maximum value (or a predetermined value) for bits 4–11, this will be sensed by gating circuits which will trigger the counter to count down bits 4–11. The gating circuits will also serve as an input to bits 1–3 which will act as an ordinary cycling binary counter. When bits 4–11 reach zero once again this condition is sensed by the gating circuits which now causes the counter to count back up again and cause the section of bits 1–3 to increase its count by 1. Bits 4–11 of clock 11 need not cycle between zero and maximum, but may be cycled between two predetermined values.

By this system the words read out of memory A will be stepped up in units of 0.7° from zero up to 45°, at which time the counter section 4–11 is triggered to count down. At the same time the words read from memory B are stepped down from the sine of 90° in 0.7° increments down to the sine of 45°. Now clock bits 4–11 will count down; therefore the word values read out of memory A will be the sine value of 45° stepped down in units of 0.7° down to 0°, at which time the memory address section will be all 0. Likewise the words read out of memory B will be stepped up from 45° in 0.7° increments until 90° is read at the time the memory address portion of the counter has counted to zero (or some predetermined value). Coupling this function with the functions of switching circuits 25 and 26 provides an output at the circuit 26 which is the sine of $\theta$ and an output at switching circuit 25 which is the cosine of $\theta$ over 0°–90° in increasing increments of 0.7°. When the proper sign is applied by sign generators 80 and 81 the outputs of the processing unit are the desired twiddle factors.

Innumerable variations of the memory are possible depending upon specific applications and upon specific hardware capabilities. Applications requiring high degrees of accuracy will need more than eight bit twiddle memories to perform actual multiplication. This invention can be expanded at will to handle any bit requirement which the twiddle memories or accuracies may impose.

I claim:

1. A system for producing sine and cosine values of a rotating vector comprising memory means containing magnitude values for a rotating vector stepped in discrete steps over a 90° range; selector means connected to said memory means whereby said magnitude values will be presented at outputs of the memory means in the proper step sequence of the rotating vector; sign generating means connected to the outputs of said memory means so as to provide the magnitude values with a proper sign in accordance with the quadrant in which the rotating vector is located; outputs of said selector means being so related to the rotating vector as to provide signals indicating the quadrant said rotating vector is in; outputs of said selector means being connected to said sign generating means so as to control the sign said sign generating means will apply to the magnitude values; said memory means is divided into first and second sections; said first section containing the magnitude values stepped in discrete steps of the sine of the angles from 0° to 45°; said second section containing the magnitude values of the sine of 90° to 45° in discrete steps; first and second outputs of said first and second sections; said selector means being connected to the first and second sections of said memory means so as to cause the first section to read out the magnitude values at its output sequentially from 0° to 45°, and said second section to read the magnitude values sequentially from 90° to 45° at its output whereby one section presents the sine magnitude value and the other section presents the cosine magnitude value; said sign generating means comprising first and second sign generating means each having an input and an output; switching means connected between the outputs of the first and second sections of the memory means and the inputs of said first and second sign generating means so as to connect the output of the section having the sine magnitude value to the first signal generating means input and to connect the output of the section having the cosine magnitude value to the input of the second signal generating means; and said selector means being connected to said switching means so as to control the operation thereof in accordance to which half of a particular quadrant the rotating vector is located.

2. A system as set forth in claim 1 wherein said selector means is a clock means having first and second parts; said first part causing said first section of said memory means to cyclically provide at its output the magnitude values of the sine of the rotating vector rotating from 0° to 45° and then backwards from 45° to 0°, and said second section to cyclically provide at its output the magnitude value of the sine of a rotating vector rotated from 90° to 45° and then from 45° to 90°; said second part of the clock means being a counter which counts half cycles of said first part; said second part of said clock means being connected to said switching means so as to cause the switching means to reverse connections each 45° of rotation of said rotating vector; and said second part also being connected to said first and second sign generating means so as to cause said sign generating means to apply the proper sign in accordance to the quadrant said rotating vecotr is located.

3. A system as set forth in claim 2 wherein said clock means is a digital clock divided into first and second parts; said first part being an up/down counter which counts up while the rotating vector is moving in the first 45° of a quadrant and counts down while the rotating vector is moving in the last 45° of a quadrant; said second part being a 3-bit digital counter wherein bit 1 is the most significant bit, bit 3 is the least significant bit and bit 2 is the middle significant bit; said second part counting once each time said first part reverses its count direction; an output from bit 3 is connected to the switching means to as to control same; an output of bit 1 being connected to said first sign generating means for controlling its operation; and outputs from bits 1 and 2 being connected to said second sign generating means for control of its operation.

4. A system for producing sine and cosine magnitude values for a rotating vector comprising memory means divided into first and second sections; said first section containing the magnitude values stepped in discrete steps of the sine of the angles from 0° to 45°; said second section containing the magnitude values of the sine of 90° to 45° in discrete steps; first and second outputs of said first and second sections; and selector means connected to the first and second sections of said memory means so as to cause the first section to read out the magnitude values at its output sequentially from 0° to 45°, and said second section to read the magnitude values sequentially from 90° to 45° at its output whereby one section presents the sine magnitude value and the other section presents the cosine magnitude value.

5. A system as set forth in claim 4 further comprising first and second output terminals; switching means connected between the outputs of the first and second sections of the memory means and said first and second output terminals so as to connect the output of the section having the sine magnitude value to the first output terminal and to connect the output of the section having the cosine magnitude value to the input of the second output terminal; and said selector means being connected to said switching means so as to control the operation thereof in accordance to which half of a particular quadrant the rotating vector is located whereby the sine magnitude values of the rotating vector always appears at the first output terminal and the cosine magnitude values always appear at the second output terminal.

6. A system as set forth in claim 5 wherein said selector means is a clock means having first and second parts; said first part causing said first section of said memory means to cyclically provide at its output the magnitude values of the sine of the rotating vector rotating from 0° to 45° and then backwards from 45° to 0°, and said second section to cyclically provide at its output the magnitude value of the sine of a rotating vector rotated from 90° to 45° and then from 45° to 90°; said second part of the clock means being a counter which counts half cycles of said first part; and said second part of said clock means being connected to said switching means so as to cause the switching means to reverse connections each 45° of rotation of said rotating vector.

* * * * *